Patented Feb. 21, 1928.

1,659,863

UNITED STATES PATENT OFFICE.

AUGUSTE DULAC, OF AGEN, FRANCE.

IMPERMEABLE COATING FOR OIL RECEPTACLES.

No Drawing. Application filed August 7, 1925, Serial No. 48,879, and in France April 15, 1925.

The object of my invention is the production of an impermeable coating for the interior of vessels for containing mineral oils and their derivatives.

My composition consists of a mixture having as a base, cement, sand, litharge boiled linseed oil and water. Other elements such as borate of manganese, glycerine, quicklime and gelatine may be added for varying the elasticity, adhering properties and impermeability of the composition to any desired degree.

In preparing my composition I prefer to use the ingredients in about the following proportions:

(a) *Solid products.*

Portland cement, 100 kgs.; quicklime, powdered, 10 kgs.; fine sand, washed, 150 kgs.; litharge, powdered, 25 kgs.; white lead, powdered, 5 kgs.; borate of manganese, powdered, ½ kgs.

(b) *Liquid products.*

Linseed oil, boiled with litharge, 100 kgs.; drying oil such for instance as colza oil, 10 kgs.; glycerin, commercial, 2 kgs.; silicate of soda, 2 kgs.; liquid siccative D, 1 liter; gelatin water, 40 liters.

The liquid siccative D is obtained by dissolving 10 per cent of powdered lithrage and 5 per cent of borate of manganese in spirits of turpentine. The whole is allowed to stand for about 8 days, with frequent agitation. The liquid is then poured off, and is kept tightly corked.

To obtain the gelatin water, 3 per cent of strong glue is placed in water and this is allowed to remain for 24 hours, then melting upon the water bath.

The silicate of soda and the glycerin form an excellent mixture, and will not become separated.

I obtain the mixture of the several products above mentioned in the following manner:

(a) *Solid products.*

I grind and finely pulverize together the cement, quick-lime, litharge, white lead and borate of manganese, until there is no visible trace of any one of these substances. The mixing is a long and difficult operation by the hand process, but may be rapidly performed by a mixing machine. To observe whether the mixture is exact, the resulting powder is smoothed over by a trowel; it should have a uniform appearance and without any yellow or white spots. The powder is then mixed with the sand as in the case of ordinary cement.

Care must be taken to avoid mixing the sand with the other substances in a single operation, for there would result a quantity of small grains of litharge and of white lead which are imperfectly pulverized, and these could only be made to disappear with great difficulty when the coating is worked up for use. When the said dry mixture has been once obtained, it is placed in sacks or barrels as for ordinary cement, and should be stored out of reach of air or dampness.

(b) *Liquid products.*

In a suitable vessel I make a mixture of the glycerin, silicate of soda and liquid siccative. This mixture is then poured in small portions at a time into the gelatin water, stirring meanwhile. The resulting solution is then poured into the two oils which have been preliminarily mixed together, pouring in a fine stream to begin with and stirring continually. This operation must be performed in a very regular manner in order to obtain a suitable mixture of oil and water and without any subsequent separation. The substances can be rapidly mixed by the use of a mixing-machine. The mixture must be preserved in well closed casks in order to prevent all oxidation of the oil.

For the preparation of the coating substance or paste, I pour upon the solid product a sufficient amount of the said mixture, energetically working up the same as in the preparation of putty. The paste should be stiff, quite homogeneous and without any exudation of water drops. In all cases it is preferable to employ mechanical apparatus in the mixing process. The paste should be put on with a trowel and should be polished in a single layer of a few millimeters thickness. It will dry within a few days, but it is preferable to allow some time to elapse before making use of the newly coated receptacles.

Obviously, it will not be indispensable to employ all of the aforesaid products, neither are the stated quantities an essential feature, and I may change the composition as well as the proportions to a certain degree without prejudice to the impermeability of the said coating; however, the basis of the coating will in all cases consist of cement, sand, litharge and linseed oil.

As a general rule, a coating of a few millimeters thickness of my said product will be sufficient to assure the perfect impermeability of the recipients which are thus treated; should it be desired to increase the thickness of the coating for greater safety, the proportion of white lead, glycerin and borate of manganese should be reduced for the better drying of the interior of the coating.

Due to a lack of attention in preparing the liquid mixture, the oil and water may tend to separate, but in this event it will suffice to add a small amount of oil to the mixture.

But, on the contrary, should the mixture prove to be too thick when about to be used, this can be corrected by adding a small quantity of oil or gasoline while constantly stirring; but water must never be added, unless indeed the mixing is to be entirely recommenced.

I claim:

An impermeable coating for receptacles adapted to contain mineral oils or derivatives thereof, consisting in the following ingredients in substantially the named proportions: cement 100 kgs., sand 150 kgs., boiled linseed oil 100 kgs., quicklime 10 kgs., litharge 25 kgs., white lead 5 kgs., borate of manganese ½ kgs., drying oil 10 kgs., glycerin 2 kgs., silicate of soda 2 kgs., gelatin 40 liters, and spirits of turpentine 1 liter.

Signed at Paris, France, this 22nd day of July, A. D. 1925.

AUGUSTE DULAC.